Patented May 14, 1940

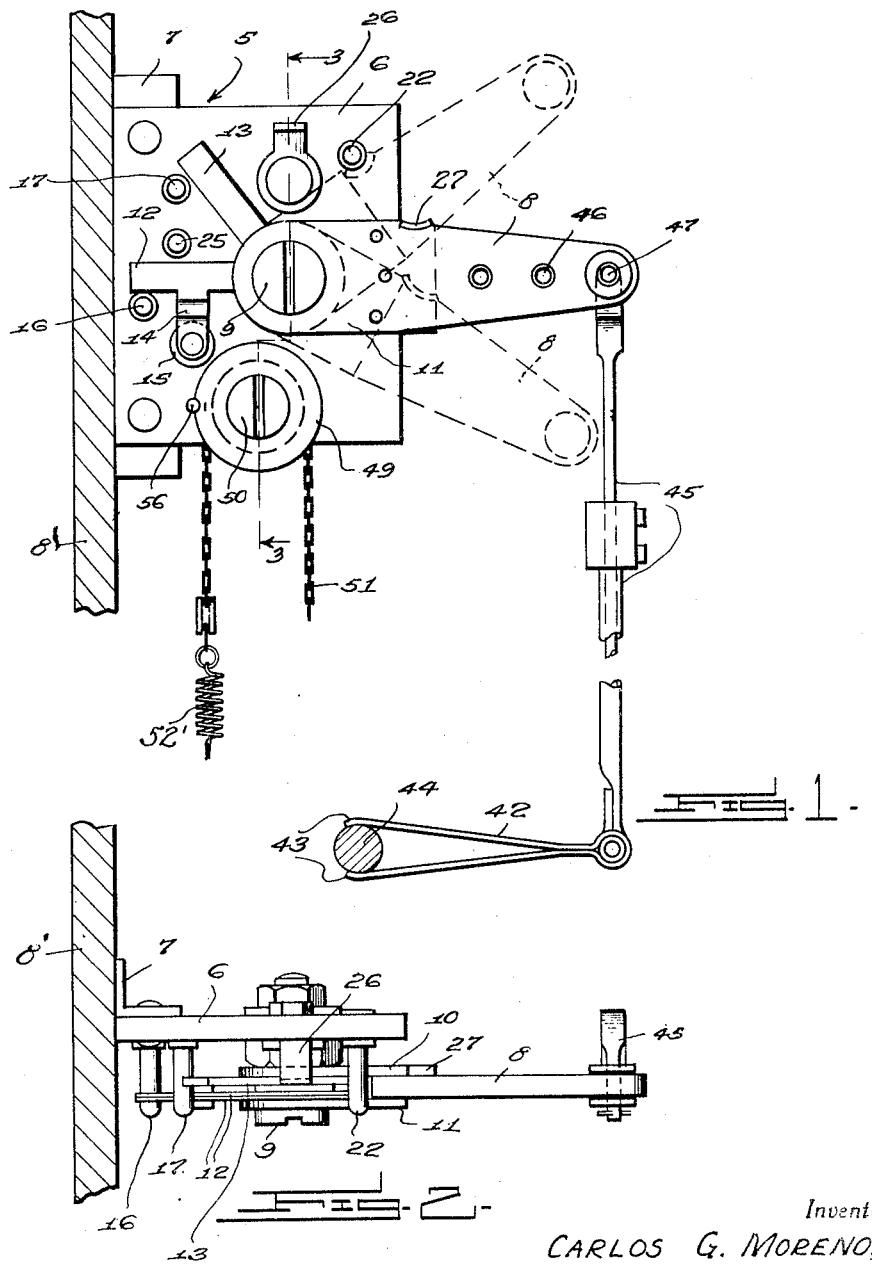

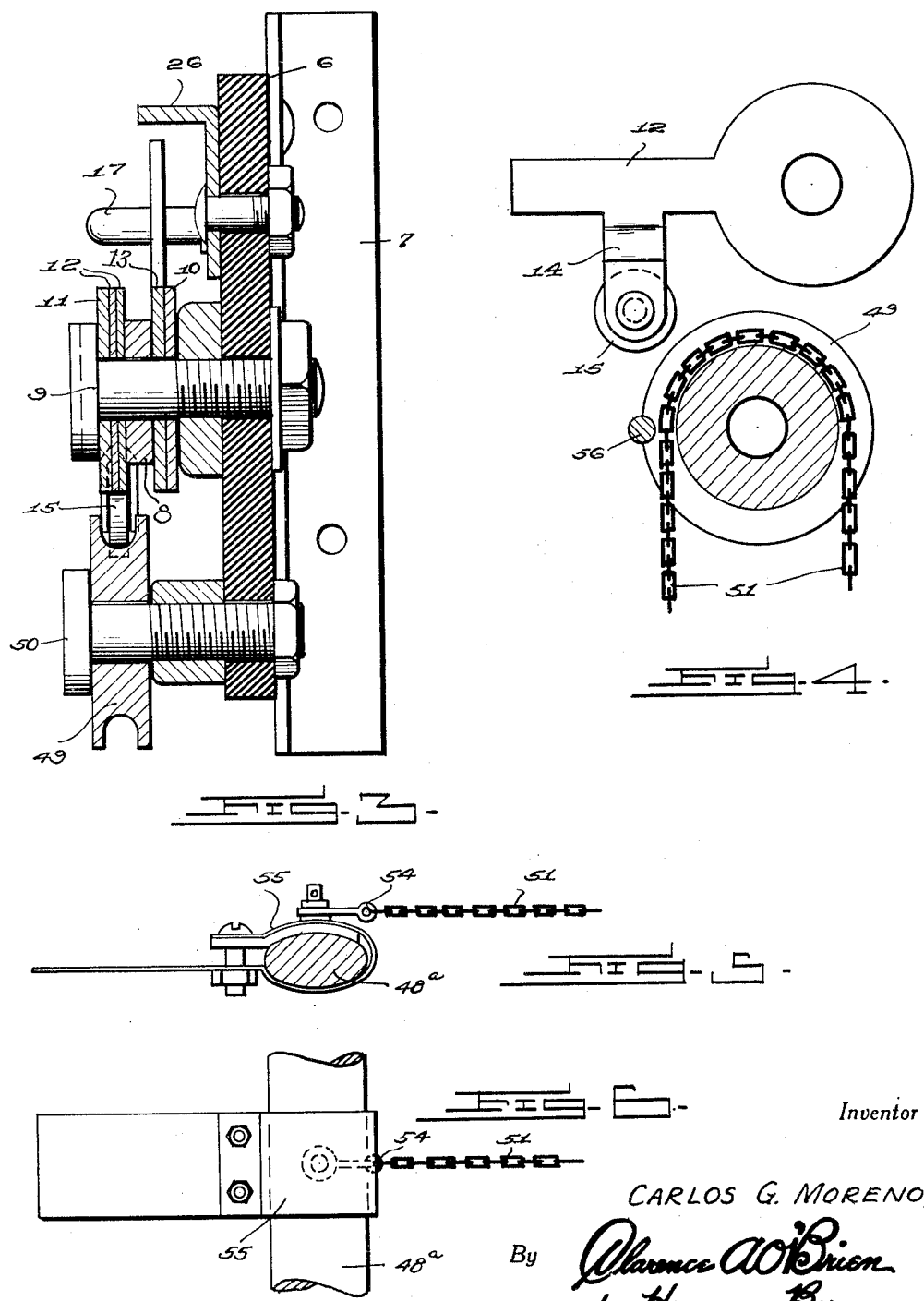

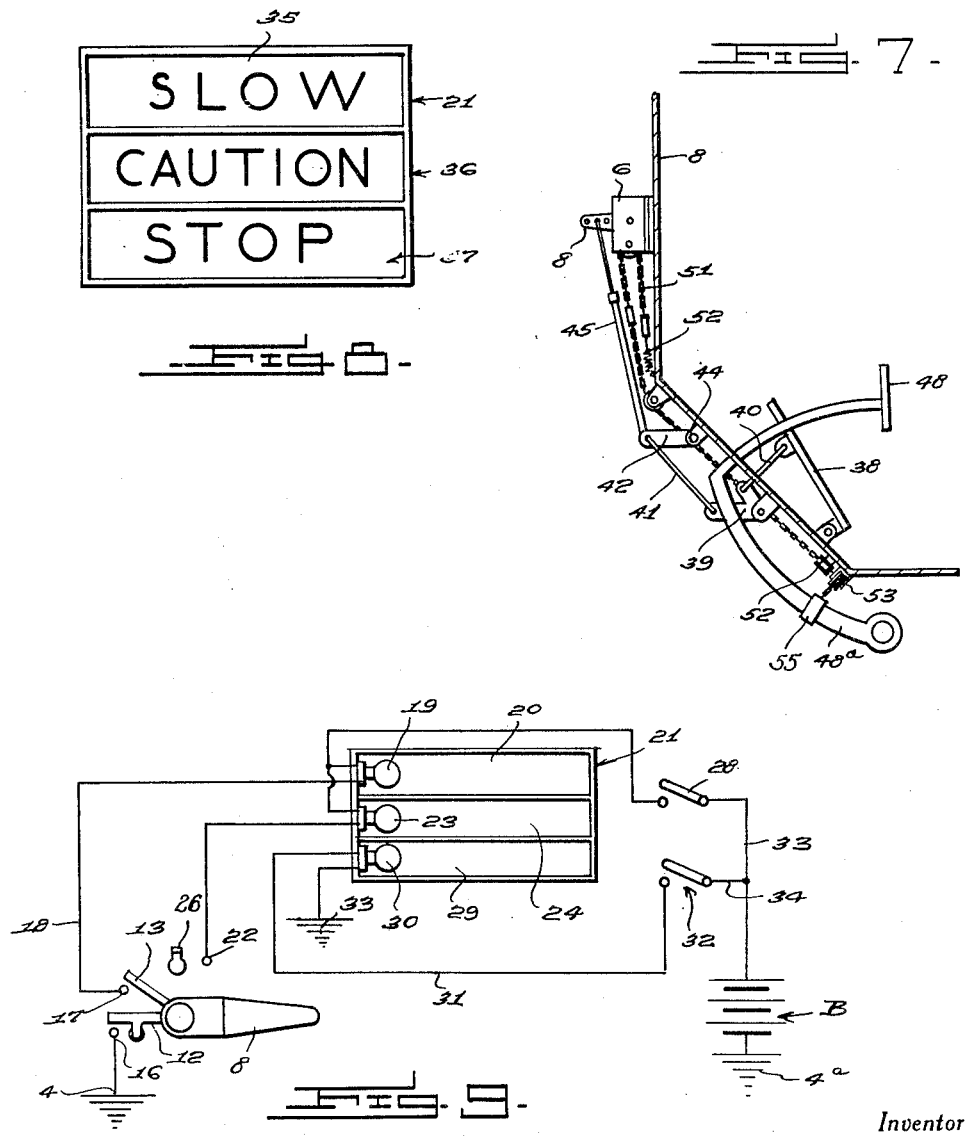

2,200,778

UNITED STATES PATENT OFFICE 2,200,778

CONTROL FOR VEHICULAR REAR SIGNAL LIGHTS

Carlos G. Moreno, Cleveland, Ohio

Application May 1, 1939, Serial No. 271,187

6 Claims. (Cl. 200—59)

This invention relates to signals for motor vehicles and more particularly to a control for the rear signal; the invention embodying a switch device so provided for effectively functioning to illuminate the "slow" and "caution" signals upon actuation of the accelerator pedal, and to illuminate the "Stop" signal upon actuation of the brake pedal.

The invention together with its objects and advantages will be best understood from a study of the following description taken in connection with the accompanying drawings wherein:

Figure 1 is a view mostly in side elevation showing the switch assembly.

Figure 2 is a top plan view of the assembly shown in Figure 1.

Figure 3 is a vertical sectional view taken substantially on the line 3—3 of Figure 1.

Figure 4 is a view showing in side elevation a switch arm, and in section a drum, said switch arm and drum being complementarily provided, in a manner hereinafter made manifest, for rotating the switch arm in response to rotative movement of the drum.

Figure 5 is a view showing the brake pedal arm in section and with a clamp associated therewith in accordance with the present invention.

Figure 6 is a plan view of the structure shown in Figure 5.

Figure 7 is a detail view showing in elevation the switch assembly, accelerator pedal, brake pedal, and the connections between the pedals and the switch.

Figure 8 is an elevational view of the rear signal, and

Figure 9 is a diagrammatic view.

Referring in detail to the drawings it will be seen that in accordance with the present invention there is provided a switch assembly indicated generally by the reference numeral 5.

The assembly 5 comprises a supporting plate 6 of insulating material mounted on the dashboard 8' or other convenient part of the motor vehicle through the medium of a bracket 7.

Pivotally mounted on the plate 6 through the medium of a bolt 9 is a switch arm 8 which has secured thereto parallel conductor plates 10 and 11 which are apertured to accommodate the bolt 9. The conductor plates 10 and 11 of the switch arm have frictional contact with switch contact arms 12 and 13 that at one end have enlarged apertured circular portions accommodating the bolt 9.

Preferably and as shown in Figures 2 and 3 the contact arm 12 is composed of two pieces of 1/32" spring brass welded together and is equipped with a depending integral bracket 14 in which is journaled a roller 15 as and for a purpose hereinafter stated.

Also mounted on the plate or panel 6 is a ground contact 16 connected to a ground as at 4; a fixed contact 17 connected by a wire 18 with one side of a lamp 19 mounted in the upper compartment 20 of a rear signal lamp casing 21; a fixed contact 22 connected with a lamp 23 in an intermediate compartment of the lamp casing 24; a stop member 25 disposed intermediate the contacts 16 and 17 and suitably insulated; and an annular stop bracket 26 mounted adjacent the upper portion of the plate 6 and suitably insulated; bracket 26 being interposed between contacts 17 and 22 and may be rotated to any desired position of adjustment so that the distance between contact 17 and stop 26 may be so adjusted to avoid unnecessary "flashing" or alternate lighting and extinguishing of the several signal lamps as might otherwise result because of the tendency of the operator to be continuously depressing and releasing the accelerator pedal.

For cooperation with the contact 22 there is provided on the conductor arm 10 of the switch lever 8 a contact 27.

In the compartment 29 of the rear signal lamp casing 21 is a lamp 30, one side of which is connected by a wire 31 with one side of a conventional brake pedal-operated switch 32, the other side of the lamp 30 being connected to a ground as at 33.

Also, and as shown, one side of switch arm 28 is connected by a wire 33, and the other side of the switch 32 is connected by a wire 34 and wire 33 with one side of a battery or other source of electrical energy B, the opposite side of the battery being connected to a ground as at 4a.

For the compartments 20, 24 and 29 of the lamp casing 21 there are provided lenses 35, 36 and 37, lens 35 being preferably of amber color; lens 36 being preferably of orange color; and lens 37 being preferably red in color.

For actuating the switch arm 8 from the accelerator pedal 38, pedal 38 is connected with a bell crank 39 through the medium of a link 40, and said bell crank is connected through the medium of a link 41 with an arm 42 fixedly secured as at 43 on the usual throttle arm 44 of the motor vehicle. Arm 42 is also connected through the medium of a longitudinally extensible and adjustable rod 45 with the switch arm 8, the latter being provided with a series of apertures 46 to accommodate the pivot pin 47 through the medium of which one end of said rod 45 is pivotally and adjustably connected with the switch arm 8.

For moving the contact arm 12 out of engagement with the ground contact 16 incidental to an application of the vehicle brakes upon depressing of the brake pedal 48 there is provided a drum 49 rotatably mounted as at 50 on the plate 6. Trained over the drum 49 is a chain or other flexible element 51 that is also trained over suitable pulleys 52, 53, at one end thereof, and at said one end is connected as at 54 to a clamp 55 embracing and secured about the brake pedal arm 48a as clearly shown in Figures 5, 6 and 7. The opposite end of the chain or flexible element 51 is resiliently anchored through the medium of a spring or the like 52' to the dash board 8' of the vehicle as shown in Figure 7.

Suitably mounted on the periphery of the drum 49 is a cam element 56 arranged to engage the roller 15 associated with the bracket 14 of the contact arm 12 while said drum rotates in response to the inward or brake-applying movement of the brake pedal 48. Thus it will be seen that as the brake pedal 48 is depressed for applying the brakes, movement thereof is transmitted through the flexible element 51 to the drum 49 causing the latter to rotate. As the drum so rotates, cam 56 thereof engages roller 15 causing arm 12 to swing upwardly relative to the switch lever 8 and out of contact with the ground contact 16 for interrupting the circuits through the lamps 19 and 23 as the circuit through the "stop" lamp 30 is completed upon application of the brake.

The operation of the device as above described may be briefly set out as follows:

When the engine of the vehicle is idle and the vehicle is at rest switch lever 8 is in the uppermost dotted position shown in Figure 1 with contact 27 engaged with contact 22 and contact 12 out of engagement with ground contact 16, as contact 12 has been moved upwardly by the previous application of the brakes in stopping the vehicle.

Thus it will be apparent that when the ignition switch is turned on incidental to starting the vehicle the circuits through the signal lamps will remain broken.

Likewise it will be apparent that as the accelerator pedal is depressed to control the supply of fuel to the engine, lever 8 will move downwardly. This movement of lever 8 will, because of the frictional connection between the lever and the contacts 12 and 13, cause the latter to move in a clockwise direction, contact 12 moving into engagement with stop 25 and contact 13, in all probability, moving a distance resulting in the engagement thereof with the stop 26. Thus it will be seen that the accelerator pedal under such conditions may be depressed to any extent desired in increasing the speed of the vehicle without completing any of the signal lamp circuits.

Now as the accelerator is permitted, under the control of the operator, to recede, lever 8 will rotate on its pivot causing contacts 12 and 13 to rotate therewith. Thus as the accelerator thus recedes contact 12 will move into engagement with contact 16 for completing the ground side of the circuits of the slow and caution lamps. As the accelerator pedal further recedes contact 13, as lever 8 moves upwardly toward the dotted line position shown in Figure 1, will ultimately engage contact 17 and contacts 12 and 16 being now engaged this engagement of contacts 13 and 17 will complete the circuit through the lamp 19 for illuminating the "slow" signal. Obviously in this connection it will be appreciated that acceleration of the speed of the vehicle following such recession or reduction in the speed of the vehicle will result in disengagement of contacts 12—16 and 13—17 thus interrupting the circuit through the "slow" signal lamp.

If the accelerator pedal is permitted to recede further than that above indicated, switch lever 8 will ultimately engage contact 22 for completing the circuit through the lamp 23 with the result that both the "slow" and "caution" signal lamps are illuminated to indicate this further decrease in the speed of the vehicle.

Should, after decreasing the speed of the vehicle to the extent causing both the "slow" and "caution" lamps to light, the speed of the vehicle is increased, obviously as the accelerator pedal is depressed for so increasing the speed of the vehicle contacts 27, 13, and 12, respectively, substantially simultaneously, will move out of engagement with contacts 22, 17, and 16, respectively, thus interrupting the circuit through the "slow" and "caution" signal lamps.

When, however, the brakes of the vehicle are applied by pushing in on the brake pedal 48 in the usual manner the switch 32, controlled by the brake pedal, will be closed for completing the circuit through the "stop" signal lamp circuit. Incidental to this application of the brake the movement of the pedal 48 to effect such application of the brake, is transmitted through the flexible element 51 to the drum 49 causing the latter to rotate. Obviously as the drum rotates in response to this movement of the brake pedal, cam 56 of said drum will engage roller 15 causing the arm 12 to swing upwardly relative to the switch lever 8 and out of contact with the ground contact 16.

Obviously contact 12 will remain out of engagement with the ground contact 15 until the cycle of operation above described is repeated. Likewise it will be also appreciated that after each application of the vehicle brake, contacts 12—16 remain disengaged until the next acceleration and recession of speed occurs in the manner hereinabove described.

It is thought that a clear understanding of the construction, operation, utility and advantages of an invention embodying the features of the present invention will be had without a more detailed description.

Having thus described the invention what is claimed as new is:

1. In a switch of the character described, a ground contact and a pair of hot contacts, a movable switch arm, a pair of pivoted contact arms having frictional engagement with said switch arm, one of said contact arms being arranged for movement in response to said switch arm into and out of engagement with said ground contact and the other of said switch arms being movable in response to said switch arm into and out of engagement with one of said hot contacts, said switch arm being of conductive material and provided with a contact engageable with the other of said hot contacts, the arrangement of said contacts and the frictional connection between said switch arm and said contact arms being such as to cause the first-mentioned contact arm to be engaged with the ground contact when either the second-mentioned contact arm or the contact on said switch arm is engaged with a hot contact.

2. In a switch of the character described, a ground contact and a pair of hot contacts, a movable switch arm, a pair of pivoted contact arms having frictional engagement with said switch arm, one of said contact arms being arranged for movement in response to said switch arm into and out of engagement with said ground contact and the other of said switch arms being movable in response to said switch arm into and out of engagement with one of said hot contacts, said switch arm being of conductive material and provided with a contact engageable with the other of said hot contacts, the arrangement of said contacts and the frictional connection between said switch arm and said contact arms being such as to cause the first-mentioned contact arm to be engaged with the ground contact when either the second-mentioned contact arm or the contact on said switch arm is engaged with a hot contact, a member rotatably mounted in proximity to the first-named contact arm, and means on said member engageable with the first-named contact arm to move the latter out of engagement with said ground contact independently of said switch arm.

3. A switch of the class described comprising a supporting member of non-conductive material, a pair of live contacts carried by the supporting member, a ground contact carried by the supporting member, a switch arm pivotally connected with the supporting member and having a conducting part thereon for engaging a live contact when the arm is in one position, a pair of contact arms pivotally supported on the supporting member and frictionally engaged by the switch arm for movement therewith, one of the contact arms engaging the second live contact when the arm is moved by the switch arm and the other contact arm engaging the ground contact when the said other contact arm is moved by the switch arm, means for moving the last-mentioned contact arm out of engagement with the ground contact independently of movement of the switch arm, said other contact arm being in engagement with the ground contact when either the other contact arm or the switch arm is engaged with a live contact unless said other contact arm has been moved out of engagement with the ground contact by said independent means, and stop means for limiting movement of the contact arms away from the contacts which they are adapted to engage.

4. A switch of the class described comprising a supporting member of non-conductive material, a pair of live contacts carried by the supporting member, a ground contact carried by the supporting member, a switch arm pivotally connected with the supporting member and having a conducting part thereon for engaging a live contact when the arm is in one position, a pair of contact arms pivotally supported on the supporting member and frictionally engaged by the switch arm for movement therewith, one of the contact arms engaging the second live contact when the arm is moved by the switch arm and the other contact arm engaging the ground contact when the said other contact arm is moved by the switch arm, means for moving the last-mentioned contact arm out of engagement with the ground contact independently of movement of the switch arm, said other contact arm being in engagement with the ground contact when either the other contact arm or the switch arm is engaged with a live contact unless said other contact arm has been moved out of engagement with the ground contact by said independent means, and stop means for limiting movement of the contact arms away from the contacts which they are adapted to engage, the stop means for the contact arm which engages the live contact being adjustable toward and away from the said contact arm.

5. A switch of the class described comprising a supporting member of non-conductive material, a pair of live contacts carried by the supporting member, a ground contact carried by the supporting member, a switch arm pivotally connected with the supporting member and having a conducting part thereon for engaging a live contact when the arm is in one position, a pair of contact arms pivotally supported on the supporting member and frictionaly engaged by the switch arm for movement therewith, one of the contact arms engaging the second live contact when the arm is moved by the switch arm and the other contact arm engaging the ground contact when the said other contact arm is moved by the switch arm, means for moving the last-mentioned contact arm out of engagement with the ground contact independently of movement of the switch arm, said other contact arm being in engagement with the ground contact when either the other contact arm or the switch arm is engaged with a live contact unless said other contact arm has been moved out of engagement with the ground contact by said independent means, and stop means for limiting movement of the contact arms away from the contacts which they are adapted to engage, the last-mentioned means including a rotary member having a cam thereon and the contact arm having a projection provided with a roller which is engaged by the cam and the rotary member is rotated to move the contact arm out of engagement with the ground contact.

6. An accelerator operated switch for a warning signal comprising a supporting member, a switch arm pivotally supported thereon and adapted to be actuated from the accelerator, a pair of contact arms pivotally supported on the supporting member and frictionally engaging the switch arm to be moved thereby, a ground contact on the supporting member for engagement by one of the contact arms, a live contact on the supporting member for engagement by the other contact arm and a second live contact on the supporting member for engagement by a conducting part of the switch arm, a member for actuating by a brake pedal, rotatably arranged on the supporting member and having a part for engaging a part of the contact arm which engages the ground contact for moving said contact arm out of engagement with said ground contact and stop means for limiting movement of the contact arms by the switch arm when said contact arms are being moved away from the contacts which they are adapted to engage, said contact arm which engages the ground contact being engaged with said ground contact when either the other contact arm is in engagement with its live contact or the switch arm is in engagement with its live contact excepting when the contact arm has been moved out of engagement with the ground contact by the rotary member.

CARLOS G. MORENO.